Sept. 6, 1960 H. BUDA 2,952,013
BELL RINGING MACHINES
Filed Aug. 15, 1956 2 Sheets-Sheet 1

INVENTOR
Herbert Buda
BY Ernest C. Montague
ATTORNEY

Sept. 6, 1960  H. BUDA  2,952,013
BELL RINGING MACHINES
Filed Aug. 15, 1956  2 Sheets-Sheet 2

Inventor:
Herbert Buda
By Ernest Montague
Attorney

United States Patent Office 2,952,013
Patented Sept. 6, 1960

2,952,013
BELL RINGING MACHINES

Herbert Buda, Vienna Austria, assignor to Josef Pfundner, Vienna, Austria

Filed Aug. 15, 1956, Ser. No. 604,249

Claims priority, application Austria Aug. 19, 1955

2 Claims. (Cl. 340—398)

The present invention relates to bell ringing machines, the driving motor of which is periodically switched on and off corresponding to the oscillations of the bell and which is connected to the bell suspension means.

In the conventional machines of that type the driving motor is controlled by a part of the bell suspension means which moves with the bell in order to synchronize the switching times of the motor with the bell oscillating frequency, which is a function of the swinging angle of the bell. With this way of controlling, a mis-switching of the motor is quite possible, as a result of variations of the members which serve for transmitting the switching movements. Particularly where chain drives are used, which are the most frequently used transmitting means, an elongation of the chain or skipping of individual teeth of the chain sprockets may occur.

In order to eliminate that disadvantage, it has already been suggested that a mechanical oscillator should be used for controlling the drive and should be operated independently of the oscillating system of the bell.

It is, therefore, one object of the present invention to provide a bell ringing machine which avoids the disadvantages of the known bell ringing machines, and wherein the control is effected by an electric oscillator, e.g., a relay in a trigger circuit or a so-called time limit relay, and that an inclination-responsive switching member, which is attached to the oscillating system, serves to adapt the oscillator to the varying oscillation frequency of the bell.

It is another object of the present invention to provide a bell ringing machine, wherein the motor is switched on and off by a relay which is connected in parallel with a capacitor and in series with a resistor and which controls itself by means of a contact of its own, whereas another contact of that relay effects the periodical switching on of the drive motor by means of a solenoid. That type of control avoids also the previously necessary complicated gear transmissions so that the power requirement is reduced and the reliability of the operation is increased.

With these and other objects in view which will become apparent in the following detailed description, the present invention will be clearly understood in connection with the accompanying drawings, in which.

Figure 1:
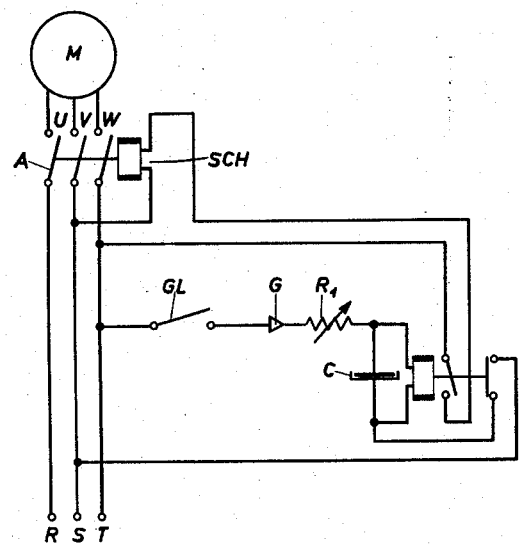
Figure 1 shows a circuit diagram applied in a device according to the present invention.

Referring now to the drawings, and in particular to Fig. 1, the bell is driven by a three-phase A.C. motor M, the terminals U, V, W of which can be connected by a switch A to the terminals R, S, T of the supply system. Two conductors of the supply system have a circuit connected to them which can be closed by the bell switch GL. That circuit includes a rectifier G, a rheostat $W_1$, a relay R and a capacitor C connected in parallel to the latter. The relay R has the function of actuating a solenoid $Sch$, which opens and closes the motor switch A.

Closing the switch GL will close the circuit of the relay R, whereby the capacitor C is charged first. When the relay R pulls up, it opens its circuit by opening the contact $r_{12}$, disconnecting the terminals $t_3$, $t_4$, whereas the contact $r_{11}$ lying in the circuit of the solenoid $Sch$ is closed at the same time, connecting the terminals $t_1$, $t_2$. The discharge of the capacitor C is performed by way of the relay R. The frequency of the trigger system will, therefore, correspond to the total of the charging and discharging periods of the capacitor C. It is substantially determined by the resistance of the relay R and the capacity of the capacitor C. These two elements may be chosen to adapt the frequency of the trigger system to the initial oscillation frequency of the bell.

To enable the adaption of the trigger frequency to the oscillation of the bell to be effected in a simple manner, even during operation, the rheostat $W_1$ is provided which can be manually controlled. An increase of its resistance will prolong the charging time of the capacitor C. Since the discharge time is not changed, the period of oscillation of the trigger system is increased, whereby it may be adapted to the frequency of the oscillations of the bell.

The frequency of oscillations of the bell being a function of the swinging angle of the bell—it decreases as the angle increases—the adaptation of the trigger frequency to the bell oscillation frequency varying during operation is effected by electric pulses initiated by the oscillating bell system, e.g., by an inclination responsive switching member $Hg$, which is attached to an oscillating part of the bell suspension means and is connected in the circuit of the capacitor C. To this end a mercury switch having a contact ball may be used, for instance. The switch may be mounted in an appropriate position to delay the closing of the capacitor circuit, whereby the beginning of the charging period is delayed and an adaptation to the prolonged oscillation period of the bell is effected.

If the pulsing by the driving motor is to be effected on both sides, a second trigger circuit and a second inclination-controlled switch is provided for adapting the trigger frequency to the oscillation frequency of the bell though the latter switch is not necessary if the apparatus is adjusted with sufficient accuracy.

Figure 2:
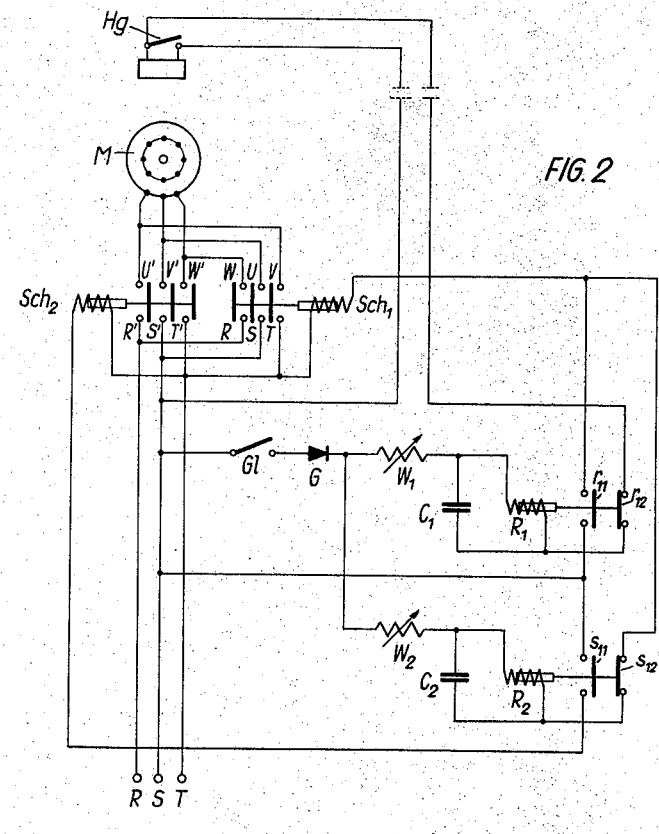
Fig. 2 is a similar circuit diagram including a reversing circuit for the motor.

Referring now to Fig. 2, which discloses a reversing for the motor M, the bell is driven again by a three-phase A.C. motor M, the terminals U, V, W and U', V', W', respectively, can be connected by a switch A and A', respectively, to connect the motor with the terminals R, S, T of the supply system for turning the motor in one or the other direction. Two conductors of the supply system have two circuits connected thereto, which can be closed by the switch G1. Both circuits include a rectifier G and one of the two circuits includes a rheostat $W_1$, a relay $R_1$ and a capacitor $C_1$ connected in parallel to the latter, while the other of the two circuits includes a rheostat $W_2$, a relay $R_2$ and a capacitor $C_2$ connected in parallel to the latter. The relay $R_1$ has the function of actuating the solenoid $Sch_1$ and the relay $R_2$ has the function of actuating the solenoid $Sch_2$, to open and close the motor switch A and A', respectively.

For the rotation of the motor M in one direction, the solenoid $Sch_1$ will cause connection of the terminals R, S, T with the terminals U, V, W and, thereby, the circuit with the rheostat $W_1$, capacitor $C_1$, relay $R_1$, and the contact $r_{11}$, simultaneously opening the contact $r_{12}$, and to the switching member $Hg$. The contact $r_{12}$ disconnects the terminals $t_3{}^a$, $t_4{}^a$ and the contact $r_{11}$ connects the terminals $t_1{}^a$, $t_2{}^a$.

For the rotation of the motor M in the other direction, the solenoid $Sch_2$ will close the terminals $R^2$, $S^2$, $T^2$ with the terminals U', V', W' and, thereby, the circuit with the rheostat $W_2$, capacitor $C_2$, relay $R_2$ and the contact $s_{11}$, simultaneously opening the contact $s_{12}$, without including however, the switching member Hg. The contact $s_{12}$ disconnects the terminals $t_3{}^b$, $t_4{}^b$ and connects the terminals $t_1{}^b$, $t_2{}^b$.

Figure 3:
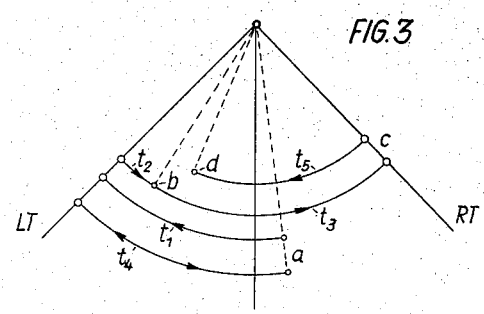
Fig. 3 is a diagram indicating the oscillations of the bell.

Referring now to Fig. 3, in which a diagram indicating the oscillations of the bell is disclosed, the left dead point LT, the right dead point RT and the zero position 0 of the oscillations of the bell are shown. At the time point $a$ just prior to reaching the zero position 0, the charging of the capacitor $C_1$ starts and the charging continues until, during its return stroke, the position $b$ is reached. Now the relay $R_1$ is operated and the discharge starts up to the point $c$. Thus $t_1+t_2$ is the charging period, while $t_3$ is the discharging period of the capacitor $C_1$. The switching member Hg remains closed for the period $t_4$, that is during the entire period from $a$ to LT and from LT to $a$.

The discharging period for the capacitor $C_2$ is indicated as $t_5$ and extends from the point $c$ to the point $d$. The capacitor $C_2$ is charged while the capacitor $C_1$ is charged. The time period for charging the capacitor $C_2$ is shorter than the discharging time for the capacitor $C_1$. The shorter time period for charging the capacitor $C_2$ is brought about by proper adjustment of the rheostat $W_2$. The timing is chosen in such a manner that the relay $R_2$ becomes operative at the same moment the relay $R_1$ is rendered inoperative. The reversal of the motor M is then obtained by means of the solenoids $Sch_1$ and $Sch_2$, respectively.

While I have disclosed several embodiments of the present invention, it is to be understood that these embodiments are given by example only and not in a limiting sense, the scope of the present invention being determined by the objects and the claims.

I claim:

1. In a bell ringing device, an oscillating mounted bell, a motor operatively connected thereto, a source of current, conductors connecting said source to said motor, a switch in said conductors between said source and said motor, a solenoid controlling said switch to assume alternately a circuit opening and closing position, an electric oscillator circuit periodically operating said solenoid and including a relay having first and second contacts, a capacitor connected in parallel with said relay, and a rheostat in series with said capacitor and said relay to control the charging time of said capacitor, said relay closing the circuit through said solenoid by means of the first of said contacts, a switching member responsive to the inclination of said bell closed by the second of said contacts so that the frequency of said oscillator circuit is controlled in accordance with the swinging frequency of said bell.

2. The bell ringing machine, as set forth in claim 1, wherein said motor is reversible, and which includes a second switch in said conductors between said source and said motor reversing the terminals of said motor, a second solenoid controlling said second switch to assume alternately a circuit opening and closing position, a second electric oscillator circuit periodically operating said second solenoid and including a second relay having first and second contacts, a second capacitor connected in parallel with said second relay, and a second rheostat in series with said second capacitor and said second relay to control the charging time of said second capacitor, said second relay closing the circuit through said second solenoid by means of the first of said last-mentioned contacts, and said second relay being operative upon rendering inoperative said first-mentioned relay.

References Cited in the file of this patent

UNITED STATES PATENTS

| 2,288,458 | Jeffers | June 30, 1942 |
| 2,512,912 | Blackburn | June 27, 1950 |
| 2,522,492 | Anderson | Sept. 19, 1950 |

FOREIGN PATENTS

| 377,642 | Germany | June 23, 1953 |